US006128967A

United States Patent [19]

Campbell

[11] Patent Number: 6,128,967

[45] Date of Patent: Oct. 10, 2000

[54] LEVEL TRANSMITTER CONNECTOR

[75] Inventor: Deon E. Campbell, Vancouver, Wash.

[73] Assignee: Seh America, Inc., Vancouver, Wash.

[21] Appl. No.: 09/294,405

[22] Filed: Apr. 20, 1999

[51] Int. Cl.[7] .......... G01F 23/00; G01D 21/00

[52] U.S. Cl. .......... 73/866.5; 73/290 R

[58] Field of Search .......... 73/290 R, 291, 73/290 B, 290 V, 866.5; 181/124; 367/87, 99, 118, 908

[56] References Cited

U.S. PATENT DOCUMENTS

| | | | |
|---|---|---|---|
| 4,554,494 | 11/1985 | Howeth | 73/305 |
| 4,691,113 | 9/1987 | Corvazier et al. . | |
| 4,942,351 | 7/1990 | Kronau . | |
| 4,958,518 | 9/1990 | Duenstl et al. | 73/290 V |
| 5,199,183 | 4/1993 | Givens . | |
| 5,243,860 | 9/1993 | Habart . | |
| 5,456,408 | 10/1995 | Appel . | |
| 5,649,450 | 7/1997 | Glab et al. . | |
| 5,737,963 | 4/1998 | Eckert et al. | 73/290 V |
| 5,755,136 | 5/1998 | Getman et al. | 73/290 V |
| 5,778,726 | 7/1998 | Müller et al. | 73/290 V |
| 5,948,979 | 9/1999 | Fitsch et al. | 73/290 V |
| 6,007,034 | 12/1999 | Stoll et al. | 248/229.1 |

FOREIGN PATENT DOCUMENTS

| | | |
|---|---|---|
| 04116651 A1 | 1/1992 | Germany . |

OTHER PUBLICATIONS

"Quick–Disconnect Fittings," page from Ryan Herco Catalog.

Liu, Le–Shan et al., "Microcomputer–Aided Liquid Level Automatic Monitoring and Measuring System," SPIE vol. 2101, Measurement Technology and Intelligent Instruments, 1993, pp. 853–855.

"Steering Out of Trouble," The Motor Ship, Jan., 1980.

Blickley, George J., "Remote Level Systems Keep Pace with Demand," Control Engineering, Jul. 1985, pp. 61–63.

Murray, R. T., "Fibre Optic Sensors for the Chemical Industry," Journal of Optical Sensors, 1986, vol. 1, No. 1, pp. 27–41.

Zorich, Bob, "Monitoring Liquid Chemical Levels: A variety of the Methods Covers the Range of Chemicals and Containers," Semiconductor International, Jul. 1997, pp. 327–336.

Hendrick, William, "Non–Contact Monitors Curb Tank Emission," Chemical Engineering, Oct. 1993, pp. 16–18.

*Primary Examiner*—Hezron Williams
*Assistant Examiner*—Michael Cygan
*Attorney, Agent, or Firm*—Oliff & Berridge, PLC

[57] ABSTRACT

A connector is provided for detachably connecting a level transmitter to a container. The container has a first connector portion fixed to the level transmitter and a second connector portion fixed to the container. In order to reduce the risk of damage to the level transmitter, the first and second connector portions are engaged without the need for relative rotation between the first and second connector portions.

19 Claims, 2 Drawing Sheets

12 10 20 30 30 30 50 30 22 24 24 5 1

LEVEL TRANSMITTER CONNECTOR

BACKGROUND OF THE INVENTION

This invention relates to a system for measuring the level of a liquid in a container and, in particular, a connector for detachably connecting a level transmitter to a portable container containing liquid.

In many industries, it is important to be able to accurately measure the amount of liquid in a container. Often such containers are opaque and, therefore, it is difficult to determine visually the amount of liquid in the container. An example of such an industry is any industry that handles hazardous chemicals or waste.

It is common practice to use a scale to weigh a container in order to approximate the amount of liquid contained therein. However, especially for large containers, such scales are often expensive, inaccurate, unreliable and/or require a high level of maintenance. As a result, the use of such scales is frequently abandoned.

SUMMARY OF THE INVENTION

In order to easily and efficiently measure the level of a liquid in a portable container, the invention provides a container for detachably connecting a level transmitter to a container. The connector has a first connector portion and a second connector portion. The first connector portion is fixed to the level transmitter and has a first engagement portion. The second connector portion is fixed to the container and has a second engagement portion that engages the first engagement portion. A cap is provided to be placed on, and engaged with, the second connector portion when the level transmitter is not attached to the container so that the container is made liquid-tight for storage or transport.

Because the level transmitters appropriate for use in measuring liquid in a container are often delicate instruments, it is important that the detachable connection function without subjecting the level transmitter to jarring, twisting or any unnecessary movement. As a result, preferred embodiments of the invention have cam-lock mechanisms for connecting the two connector portions that require zero rotation between the two connector portions.

The invention also provides a system for measuring the level of a liquid in a container. The system has a level transmitter that measures the level of the liquid, a first connector portion connected to the level transmitter and having a first engagement portion, and a second connector portion for connecting to the container and having a second engagement portion. The first connector portion is detachably connectable to the second connector portion such that the first and second engagement portions go from a disengaged state to an engaged state by operating a cam-lock mechanism without relative rotation between the first and second connector portions.

The invention also provides a method of measuring the level of a liquid in a container. The method involves fixing a first connector portion to a level transmitter fixing a second connector portion to the container, and detachably connecting the first connector portion to the second connector portion without rotating one of the first and second connector portions relative to the other of the first and second connector portions. The level transmitter then measures the distance from the level transmitter to the surface of the liquid. It is preferable for the level transmitter to measure the distance to the surface of the liquid without contacting the liquid. Such level transmitters include the "Probe" by Miltronix.

BRIEF DESCRIPTION OF THE DRAWINGS

The foregoing and further objects, features, and advantages of the invention will be described in or apparent from the following description of embodiments with reference to the accompanying drawings, wherein like numerals are used to represent like elements and wherein.

DETAILED DESCRIPTION OF PREFERRED EMBODIMENTS

The invention provides a connector for detachably connecting a level transmitter to a container. The connector has two connector portions, one fixed to the level transmitter and the other fixed to the container. In order to minimize movement of, and possible damage to, the level transmitter, the detachable connection probably functions without substantially rotating the connector portions relative to each other. An example of a connector according to the invention is a cam-lock mechanism for connecting the two connector portions that requires no relative rotation between the two connector portions. In one such cam-lock mechanism, the connector portion attached to the level transmitter has two levers pivotably attached to it, each lever having a cam that engages a recess in the connector portion attached to the container.

A system for measuring the level of a liquid in a container according to the invention has a level transmitter that measures the level of the liquid, a connector portion connected to the level transmitter and a connector portion for connecting to the container. The connector portions are detachably connectable to each other such that engagement portions in each of the connectors go from an engaged state to a disengaged state without the need to rotate the connector portions relative to one another.

A method according to the invention connects a level transmitter to a container by fixing one connector portion to the level transmitter, fixing another connector portion to the container, and detachably connecting the connector portions to each other without substantially rotating the connector portions relative to one another.

In a typical use of the invention, the level transmitter has flexible power and signal connections to a power source and signal processing equipment. The level transmitter is preferably a subsonic, radar, optical, or other measuring device that measures the distance from the transmitter to the surface of the liquid without contacting the surface of the liquid. Numerous containers, each equipped with an appropriate connector portion, are brought to the location of the level transmitter. The connector portion fixed to the level transmitter is connected to the connector portion fixed to a first container. While the level transmitter is connected to the container, the level of liquid in that container is measured. After the measurement is taken, the level transmitter is detached from the first container and a replaceable cap (which mates with the connector portion fixed to the container) is connected to the connector portion fixed to the container. The level transmitter is then attached to another container and the process is repeated. This method allows the liquid level of many containers to be quickly and easily measured without subjecting the level transmitter to potentially harmful rotational movement.

Figure 1:
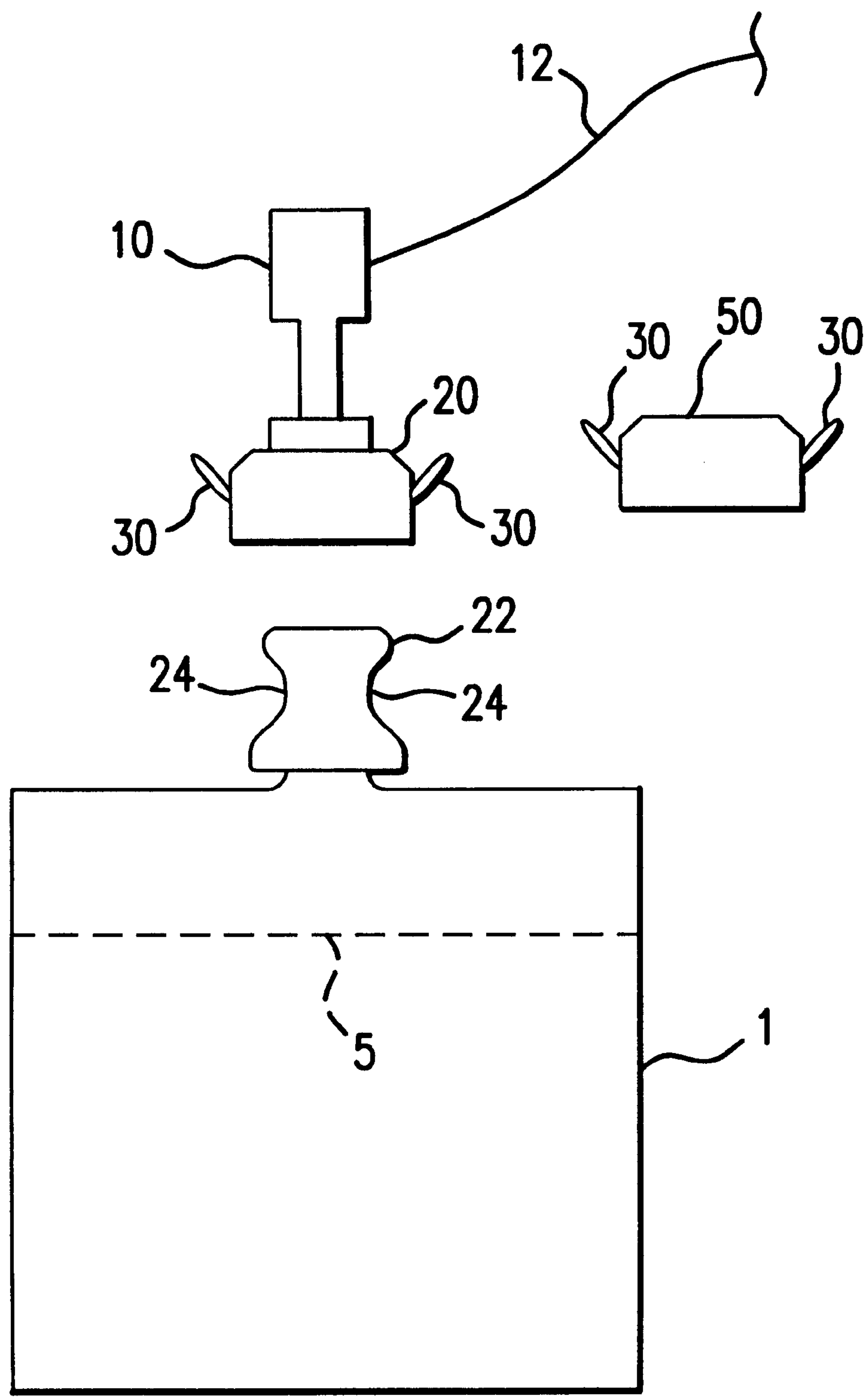
FIG. 1 is a side view of a system including an embodiment of the invention with the level transmitter detached from the container.

FIG. 1 shows a use of the invention in which a level transmitter 10 is connected to a container 1 to measure the level of a liquid surface 5. The level transmitter 10 is connected to a power source (not shown) and a signal receiver (not shown) by a connection 12.

Figure 2:
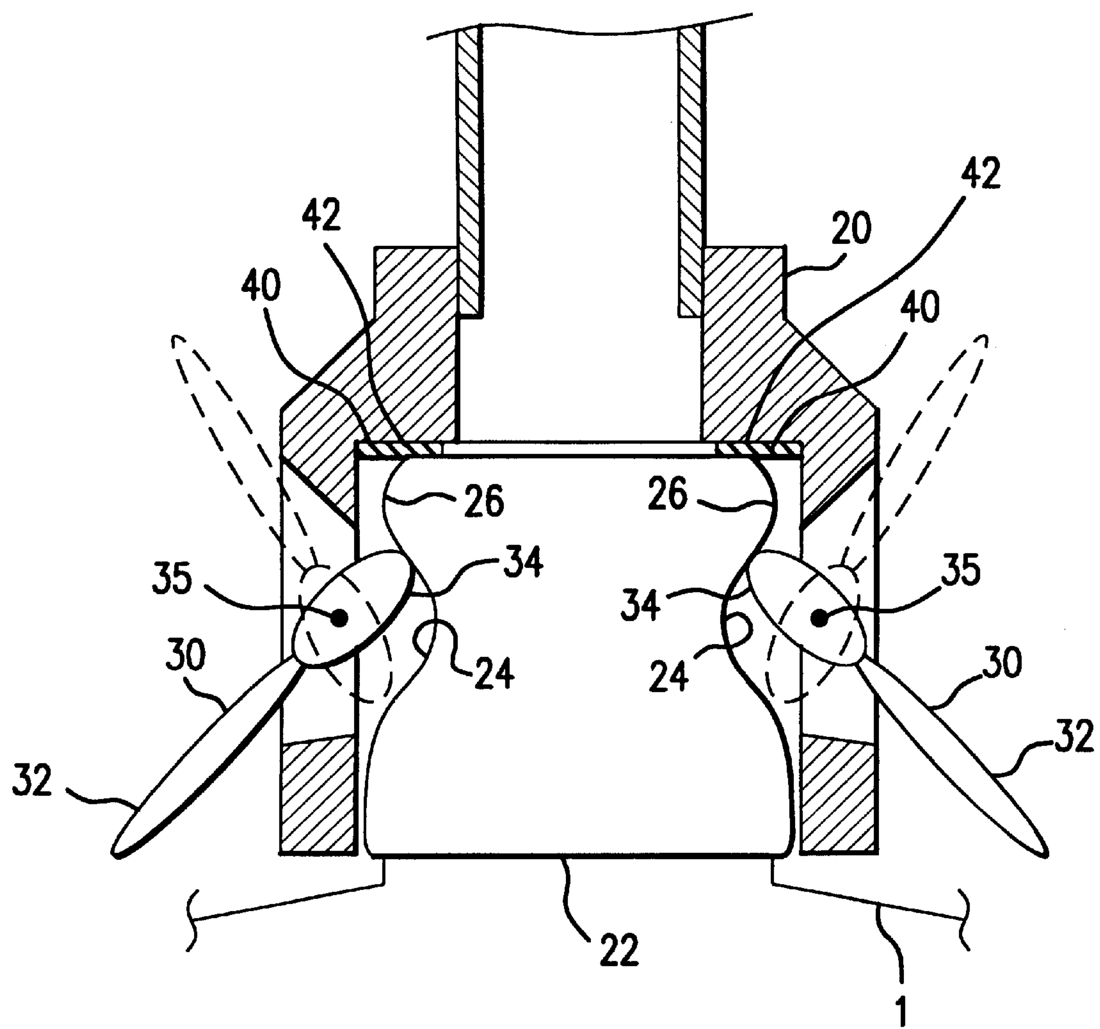
FIG. 2 is a side view of the embodiment of shown in FIG. 1 with the level transmitter attached to the container.

The connector of the embodiment shown in FIGS. 1 and 2 has a first connector portion 20 and a second connector portion 22. The first connector portion 20 has two engagement levers 30 pivotably attached to the first connector portion 20 by pivot pins 35. Each engagement lever 30 has a handle end 32 and a cam end 34. The second connector portion 22 has a recess 24 that receives cam end 34 of each engagement lever 30.

While FIGS. 1 and 2 show recess 24 as an annular recess in the exterior surface of second connector portion 22, a separate recess for each of the engagement levers could be provided. Also, while two engagement levers 30 are shown, three or more engagement levers could be used.

FIG. 1 shows a cap 50 that is placed over the second connector portion 22 in the same manner as first connector portion 20 when the container 1 is not connected to the level transmitter 10. The cap 50 is a closed cap to prevent material from entering or exiting the container 1 when the container 1 is not connected to the level transmitter 10.

An example of the connection operation using the connector of the invention is as follows. The container 1 is normally fixed in location due to its weight and/or the weight of the liquid in the container. The first connector portion 20 and attached level transmitter 10 are lowered into position so that the first connector portion 20 receives the second connector portion 22. More specifically, a wide upper portion 26 of the second connector portion 22 passes past the engagement ends 34 of the engagement levers 30 while the handle ends 32 of the engagement levers 30 are in the upper position (shown in broken lines in FIG. 2). The upper surface of the wide upper portion 26 is pressed against a bearing surface 42 of first connector portion 20 by moving the handle ends 32 of the engagement levers 30 to the lower position (shown in solid lines in FIG. 2). As a result, the first connector portion 20 is clamped to second connector portion 22 by moving the handle ends 32 to the lower position. The first and second connector portions remain connected to each other until the handle ends 32 of the engagement levers 30 are moved to the upper position.

FIG. 2 shows a bearing material 40 attached to the bearing surface 42. The bearing material 40 can be a resilient material, such as rubber, and can provide a seal when pressed between second connector portion 22 and bearing surface 42.

Although the invention has been described with references to the embodiments shown in the figures, it is to be understood that other connection methods can also be used that do not subject the level transmitter to significant jarring or rotational movement.

While the invention has been described with reference to embodiments thereof, it is to be understood that the invention is not limited to the disclosed embodiments or structures. To the contrary, the invention is intended to cover various modifications and equivalent arrangements. In addition, while the various elements of the disclosed invention are shown in various combinations and configurations, which are exemplary, other combinations and configurations are also within the spirit and scope of the invention.

What is claimed is:

1. A method of measuring a level of a liquid in a container, comprising:

fixing a first connector portion to a level transmitter, the first connector portion having a first engagement portion;

fixing a second connector portion to the container, the second connector portion having an axis and a second engagement portion;

detachably connecting the first connector portion to the second connector portion so that the level transmitter is positioned to measure a distance to a surface of the liquid by moving the first engagement portion relative to the second engagement portion such that only relative movement between the first and second connector portions along the axis is required to connect the first and second connector portions; and measuring the distance between the level transmitter and a surface of the liquid, wherein the first engagement portion comprises a plurality of levers, each lever pivotably attached to the first connector portion by a pivot pin and having an engagement end, the second engagement portion comprises a recess in an outer surface of the second connector portion, and the first and second engagement portions go from a disengaged state to an engaged state when the plurality of levers are pivoted around the pivot pins such that the engagement ends of the plurality of levers contact the recess.

2. The method of claim 1, wherein the recess is an annular recess around the outer surface of the second connector portion.

3. The method of claim 1, wherein the level transmitter measures without contacting the liquid.

4. The method of claim 3, wherein the level transmitter is an ultrasonic position detector.

5. The method of claim 3, wherein the level transmitter is a radar position detector.

6. The method of claim 3, wherein the level transmitter is an optical position detector.

7. A level measuring system for measuring the level of a liquid in a container, comprising:

means for fixing a first connector portion to a level transmitter, the first connector portion having a first engagement portion;

means for fixing a second connector portion to the container, the second connector portion having an axis and a second engagement portion; and means for detachably connecting the first connector portion to the second connector portion so that the level transmitter is properly positioned to make a measurement indicative of a level of the liquid by moving the first engagement portion relative to the second engagement portion such that only relative movement between the first and second connector portions along the axis is required to connect the first and second connector portions, wherein the first engagement portion comprises a plurality of levers, each lever pivotably attached to the first connector portion by a pivot pin and having an engagement end, the second engagement portion comprises a recess in an outer surface of the second connector portion, and the first and second engagement portions go from a disengaged state to an engaged state when the plurality of levers are pivoted around the pivot pins such that the engagement ends of the plurality of levers contact the recess.

8. A level measuring system for measuring the level of a liquid in a container, comprising:

a level transmitter that measures the level of the liquid without physically contacting the liquid;

a first connector portion fixed to the level transmitter and having the first engagement portion; and a second connector portion for fixing to the container and having an axis and a second engagement portion, wherein the first connector portion is connected to the second connector portion so that the level transmitter is properly positioned to make a measurement indicative of a level of the liquid by moving the first engagement portion relative to the second engagement portion such that only relative movement between the first and second connector portions along the axis is required to connect the first and second connector portions, and the first engagement portion comprises a plurality of levers, each lever pivotably attached to the first connector portion by a pivot pin and having an engagement end, the second engagement portion comprises a recess in an outer surface of the second connector portion, and the first and second engagement portions go from a disengaged state to an engaged state when the plurality of levers are pivoted around the pivot pins such that the engagement ends of the plurality of levers contact the recess.

9. The system of claim 8, wherein the recess is an annular recess around the outer surface of the second connector portion.

10. The method of claim 9, wherein the level transmitter is an ultrasonic position detector.

11. The method of claim 9, wherein the level transmitter is a radar position detector.

12. The method of claim 9, wherein the level transmitter is an optical position detector.

13. A method of measuring a level of a liquid in a container, comprising:

fixing a first connector portion to a level transmitter, the first connector portion having a first engagement portion, the first engagement portion comprising a plurality of levers, each lever pivotably attached to the first connector portion by a pivot pin and having an engagement end;

fixing a second connector portion to the container, the second connector portion having an axis and a second engagement portion, the second engagement portion comprising a recess in an outer surface of the second connector portion;

detachably connecting the first connector portion to the second connector portion by moving the first engagement portion relative to the second engagement portion such that only relative movement between the first and second connector portions along the axis is required to connect the first and second connector portions, the first and second engagement portions going from a disengaged state to an engaged state when the plurality of levers are pivoted around the pivot pins such that the engagement ends of the plurality of levers contact the recess; and measuring the distance between the level transmitter and a surface of the liquid.

14. The method of claim 13, wherein the recess is an annular recess around the outer surface of the second connector portion.

15. The method of claim 13, wherein the level transmitter measures without contacting the liquid.

16. The method of claim 13, wherein the level transmitter is an ultrasonic position detector, a radar position detector and an optical position detector.

17. A level measuring system for measuring a level of a liquid in a container, comprising:

a level transmitter that measures the level of the liquid without physically contacting the liquid;

a first connector portion fixed to the level transmitter and having a first engagement portion, the first engagement portion comprising a plurality of levers, each lever pivotably attached to the first connector portion by a pivot pin and having an engagement end; and a second connector portion for fixing to the container and having an axis and a second engagement portion, the second engagement portion comprising a recess in an outer surface of the second connector portion;

wherein the first connector portion is connected to the second connector portion by moving the first engagement portion relative to the second engagement portion such that only relative movement between the first and second connector portions along the axis is required to connect the first and second connector portions, and the first and second engagement portions go from a disengaged state to an engaged state when the plurality of levers are pivoted around the pivot pins such that the engagement ends of the plurality of levers contact the recess.

18. The system of claim 17, wherein the recess is an annular recess around the outer surface of the second connector portion.

19. The system of claim 17, wherein the level transmitter is one of an ultrasonic position detector, a radar position detector and an optical position detector.

* * * * *